(12) United States Patent  (10) Patent No.: US 8,271,957 B2
Wedel et al.  (45) Date of Patent: *Sep. 18, 2012

(54) TRACE MANAGEMENT IN CLIENT-SERVER APPLICATIONS

(75) Inventors: Malte Wedel, Heidelberg (DE); Andreas Roessler, Sulzfeld (DE)

(73) Assignee: SAP AG, Walldorf (DE)

( * ) Notice: Subject to any disclaimer, the term of this patent is extended or adjusted under 35 U.S.C. 154(b) by 951 days.

This patent is subject to a terminal disclaimer.

(21) Appl. No.: 12/138,706

(22) Filed: Jun. 13, 2008

(65) Prior Publication Data

US 2008/0313504 A1  Dec. 18, 2008

Related U.S. Application Data

(63) Continuation of application No. 10/734,610, filed on Dec. 11, 2003, now Pat. No. 7,404,180.

(51) Int. Cl.
*G06F 9/44*  (2006.01)

(52) U.S. Cl. ....................................... 717/128

(58) Field of Classification Search .................. 717/128, 717/131
See application file for complete search history.

(56) References Cited

U.S. PATENT DOCUMENTS

| | | | |
|---|---|---|---|
| 4,052,721 A | 10/1977 | Ross | |
| 4,437,184 A | 3/1984 | Cork et al. | |
| 4,868,750 A | 9/1989 | Kucera et al. | |
| 6,393,472 B1 | 5/2002 | Anerousis et al. | |
| 6,404,743 B1 | 6/2002 | Meandzija | |
| 6,438,472 B1* | 8/2002 | Tano et al. | 701/35 |
| 6,473,407 B1 | 10/2002 | Ditmer et al. | |
| 6,553,564 B1 | 4/2003 | Alexander et al. | |
| 6,751,789 B1 | 6/2004 | Berry et al. | |
| 6,765,739 B2 | 7/2004 | Hogan et al. | |
| 6,915,307 B1 | 7/2005 | Mattis et al. | |
| 6,944,130 B1 | 9/2005 | Chu et al. | |
| 7,000,150 B1 | 2/2006 | Zunino et al. | |
| 7,069,185 B1* | 6/2006 | Wilson et al. | 702/188 |
| 7,197,561 B1 | 3/2007 | Lovy et al. | |
| 2002/0066071 A1 | 5/2002 | Tien et al. | |
| 2003/0005111 A1 | 1/2003 | Allan | |
| 2004/0006652 A1 | 1/2004 | Prall et al. | |
| 2004/0015579 A1 | 1/2004 | Cooper et al. | |
| 2004/0037199 A1* | 2/2004 | Moriwaki | 369/53.34 |
| 2004/0064731 A1* | 4/2004 | Nguyen et al. | 713/201 |
| 2004/0103315 A1 | 5/2004 | Cooper et al. | |
| 2007/0055766 A1 | 3/2007 | Petropoulakis et al. | |

OTHER PUBLICATIONS

Bieszczad, Andrzej; Pagurek, Bernard; White, Tony, "Mobile Agents for Network Management", 1998, IEEE Communications Survey, retrieved from scholar.google.com search Mar. 28, 2007.

Chen, et al. "Automatic trace analysis for logic of constraints", Jun. 2003, ACM, DAC 2003, p. 460-465.

(Continued)

*Primary Examiner* — Anna Deng
(74) *Attorney, Agent, or Firm* — Finnegan, Henderson, Farabow, Garrett & Dunner, LLP (57) ABSTRACT

There are methods and apparatus, including computer program products, for generating an integrated trace output file on a system having a first computing device and a second computing device. The first computing device generates a first trace output and receives a second trace output from the second computing device. The first computing device generates an integrated trace output file by combining the second trace output with the first trace output.

18 Claims, 3 Drawing Sheets

OTHER PUBLICATIONS

Microsoft Computer Dictionary 2002, p. 346, 525.

Miller, John A.; Sheth, Amit P.; Kochut, Krys J.; Palaniswami, Devanand, "The Future of Web-Based Workflows", 1997, retrieved by scholar.google.com search Mar. 28, 2007.

Paganeli, Laila; Paterno, Fabio, "Intelligent Analysis of User Interactions with Web Applications", p. 111-118, ACM 2002, retrieved Mar. 28, 2007.

Winters, Gerald; Zhu, Zhenjun; Bauer, Michael; Lutfiyya, Hanan; Muntz, Daniel A.; Teorey, Toby J.; "An Architecture for Monitoring and Modeling Network Systems", p. 1-15, ACM, Nov. 1995, retrieved Mar. 28, 2007.

* cited by examiner

TRACE MANAGEMENT IN CLIENT-SERVER APPLICATIONS

This is a continuation of application Ser. No. 10/734,610, filed Dec. 11, 2003 now U.S. Pat. No. 7,404,180, which is incorporated herein by reference.

BACKGROUND

The present invention relates to data processing by a computing device, and more particularly to trace management techniques in client-server applications. User interfaces facilitate the interaction between humans and computers by inviting and responding to user input. User interfaces come in many varieties, and are designed to work in concert with application programs. A common scenario involving user interfaces is a network application, where a network connects an application program running on a server and one or more user interfaces running on client devices. The client/server relationship is one in which a server provides services to the client devices. Both the client devices and the server typically have a network interface for accessing networks such as a local area network (LAN), a wide area network (WAN), or the Internet.

In a network environment, a common client device is a personal computer and a common client program with a user interface is a Web browser. The client program enables networked communication between the client device and a server using a data transfer protocol, e.g., the Hypertext Transfer Protocol (HTTP), to exchange files, images, or programs. HTTP is a request/response-type protocol that specifies how the client device and the server communicate with each other. The server may receive a request from the client device using HTTP, respond to the request, and then close the connection. HTTP is a stateless protocol, meaning that each time a client device requests a Web page, the server will respond to the request independently of any previous requests by the client device, and without recording the request.

The contents of a file transmitted from the server and intended for display in the client program on the client device may be marked up with Hypertext Markup Language (HTML) code or Extensible Markup Language (XML) code. HTML is a language that is used to describe the structure of a document, such as a Web page. Client programs interpret HTML code to determine how to display the information contained in the page. A user may request a Web page from a server by clicking on a hyperlink or specifying a Uniform Resource Locator (URL) string. A URL can be used to identify the address of a file that may be accessed on the Internet. The address identifies the Web server on which the file is stored and the directory in which the file is located. When the server receiving the URL request finds the sought Web page, the server sends the page to the client device so that the client device can use that Web page, for example, by generating a display for a user according to the Web page.

SUMMARY OF THE INVENTION

The techniques described herein provide methods and apparatus, including computer program products, for trace management techniques in client-server applications.

In general, in one aspect, there is a computer program product, tangibly embodied in an information carrier, for generating an integrated trace output file on a system having a first computing device and a second computing device. The computer program product is operable to cause data processing apparatus to generate a first trace output at a first computing device, receive a second trace output from a second computing device, and generate an integrated trace output file by combining the second trace output with the first trace output. The first computing device may be a server and the second computing device may be a client.

In other examples, the computer program product has one or more of the following features. An agent, e.g., employing JAVA™ ("Java") and JAVA™ Script ("JavaScript") code, can be provided for detecting an event at the second computing device. The product can identify a severity level for event detection at the first computing device, and detect an event having the identified severity level. The product can also identify a severity level for event detection at the second computing device, and detect an event having the identified severity level. The severity levels indicate whether the trace outputs include an error message, a warning message, an information message, or a debug message. The second trace output can be integrated with the first trace output in a chronological order. An active component trace output can be sent from the second computing device to the first computing device for integration with the first trace output. The integrated trace output can be displayed on the second computing device in a separate browser window.

In another aspect, there is a method for detecting an event at a client, generating a client-side trace output in response to the event detection at the client, and transmitting the client-side trace output to a server for integration with a server-side trace output. The method can include detecting the event at a client device while a user is interacting with an application program executing on the server. The method can also include detecting an event at the server while the user is interacting with the application program, generating the server-side trace output in response to the event detection at the server, and integrating the server-side trace output with the client-side trace output to generate a single trace output file.

In another aspect, there is a system for generating an integrated trace output file. The system includes a client agent having a detection module configured to detect an event at a client, a generation module configured to generate a client-side trace output in response to the event detection at the client, and a communication module configured to transmit the client-side trace output to a server. The system also includes a server agent having a detection module configured to detect an event at the server, a generation module configured to generate a server-side trace output in response to the event detection at the server, a communication module configured to receive the client-side trace output from the client, and an integration module configured to generate an integrated trace output file by combining the client-side trace output with the server-side trace output. In other example, the system has one or more of the following features. The system can have a client program including the client agent and an application program including the server agent.

The details of one or more examples are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
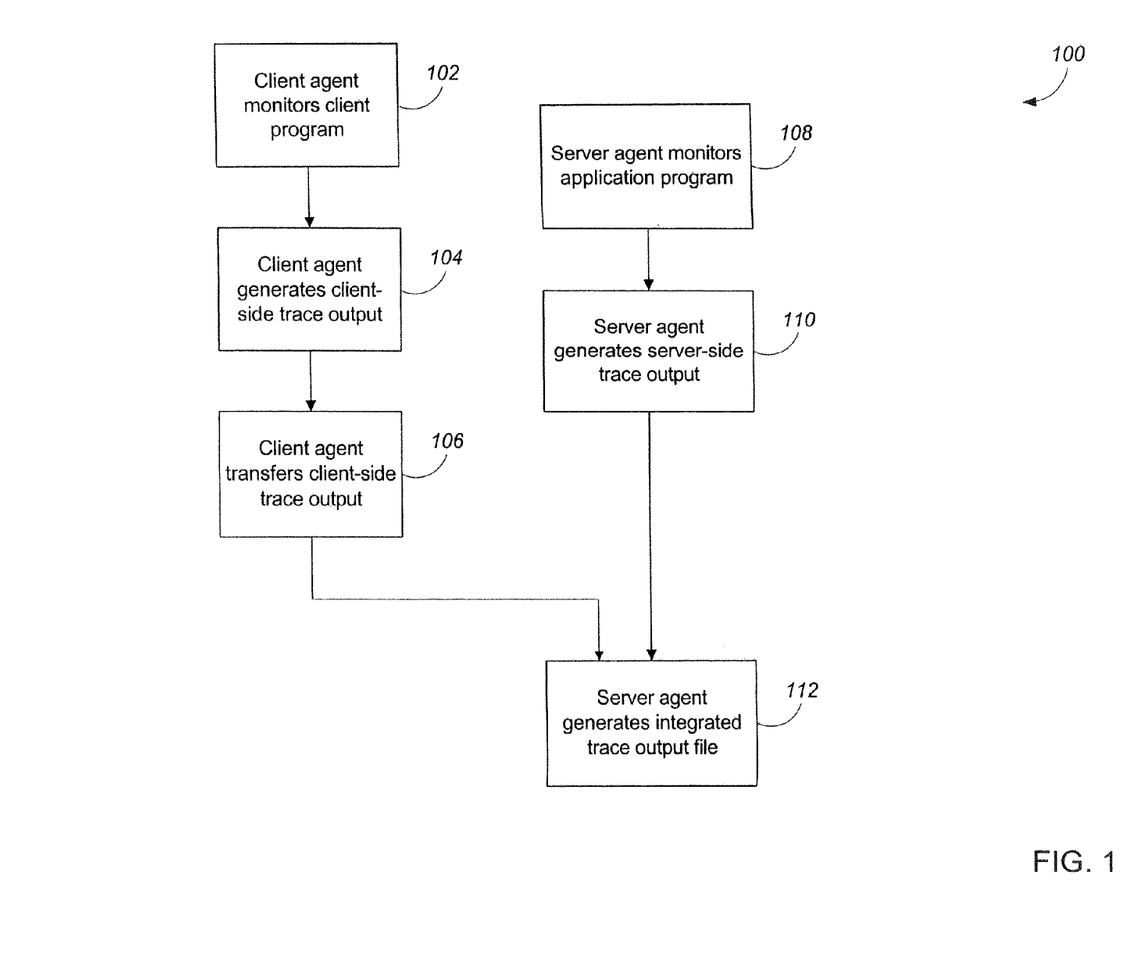
FIG. 1 shows a trace management process.

FIG. 1 shows a trace management process 100 implemented in a computer program for integrating trace outputs generated by a client and a server into a single trace output file. As described in more detail below, the client and the server are computers, interacting through a communications network, that have a client-server relationship arising by virtue of computer programs running on the respective computers. Generally, the server computer executes a server application program and the client computer serves as an interface for a user to interact with the server application program executing on the server. The client (e.g., executing a user interface application) receives input from a user, transmits that input to the server computer, and displays output generated from the server computer in response to that input. Due to possible delays in the communications network, requiring a server round-trip (i.e., from the client to the server and back to the client) in order to generate a display in response to each user input can lead to a delayed and frustrating experience for the user.

As a result, user interface applications on the client computers are becoming more sophisticated and doing more processing of data at the client independently, without relying on a round trip to the server to react to the user input. For example, a client-side framework executing on the client computer can process data changes and handle some errors independently, without requiring a server round-trip. Because of this independent processing and client portion sophistication, the server application program no longer is involved in each processing step.

For debugging situations, the server application program does not know, in a machine sense, what is happening on the client during this independent processing. To aid the application developer in the debugging process, a trace program executed by a client agent and a server agent can be used to generate trace outputs. In process 100, a client agent executing the trace program monitors (102) the client program and generates (104) a client-side trace output for processing done on the client computer. Similarly, a server agent executing the trace program monitors (108) the server application program and generates (110) a server-side trace output for processing done on the server computer. The server computer integrates (112) the server-side trace output with the client-side trace output that the client agent transmits (106) to the server computer.

The client agent and the server agent (executing the trace program) search for the occurrences of certain events. Upon the occurrence of these events (e.g., a non-fatal error), one or more trace statements are generated, which may include a state of the client program or the server application program at the occurrence of each such event, and the address of the program instruction at the time of the occurrence of the event. These trace statements are then outputted as a trace (referred to as a "client-side trace output" or a "server-side trace output" as appropriate).

Generally, a trace output includes trace statements, which are categorized in groups and severity levels, so that specific parts of the client program and the server application program may be traced as they are executed on the client and the server, to varying degrees of detail. Categories may be specific sub-products (e.g. a database driver) or functional groups (e.g. memory allocation). In one example, the application developer inserts five conditional compilation statements into the server application program code that result in the generation of trace statements of a particular severity level when a condition is satisfied. The five conditional compilation statements are: (1) if a user selects severity level "1" at run-time, the trace program will generate trace statements only when fatal errors occur (e.g., unrecoverable errors that result in terminating the program); (2) if a user selects severity level "2" at run-time, the trace program will generate trace statements when non-fatal errors occur (e.g., recoverable errors, such as exceptions that are caught and handled, dropped connections that can be reestablished, and recoverable database errors); (3) if a user selects severity level "3" at run-time, the trace program will generate trace statements for warnings (e.g., advance notice of impending problems, such as when the program is nearing resource or performance limits); (4) if a user selects severity level "4" at run-time, the trace program will generate informational trace statements (e.g., documenting program flow); and (5) if a user selects severity level "5" at run-time, the trace program will generate trace statements for debug purposes (e.g., low-level information used in code debugging or unit testing, such as local variables, loop variables, branching logic and data passed from the server to the client or vice versa). The trace program can be implemented to allow a user (e.g., the application developer) to select a severity level for the client-side trace output and the server-side trace output at run-time through a server user interface. Because the trace is handled separately, different severity levels can be set for the client and the server.

Figure 2:
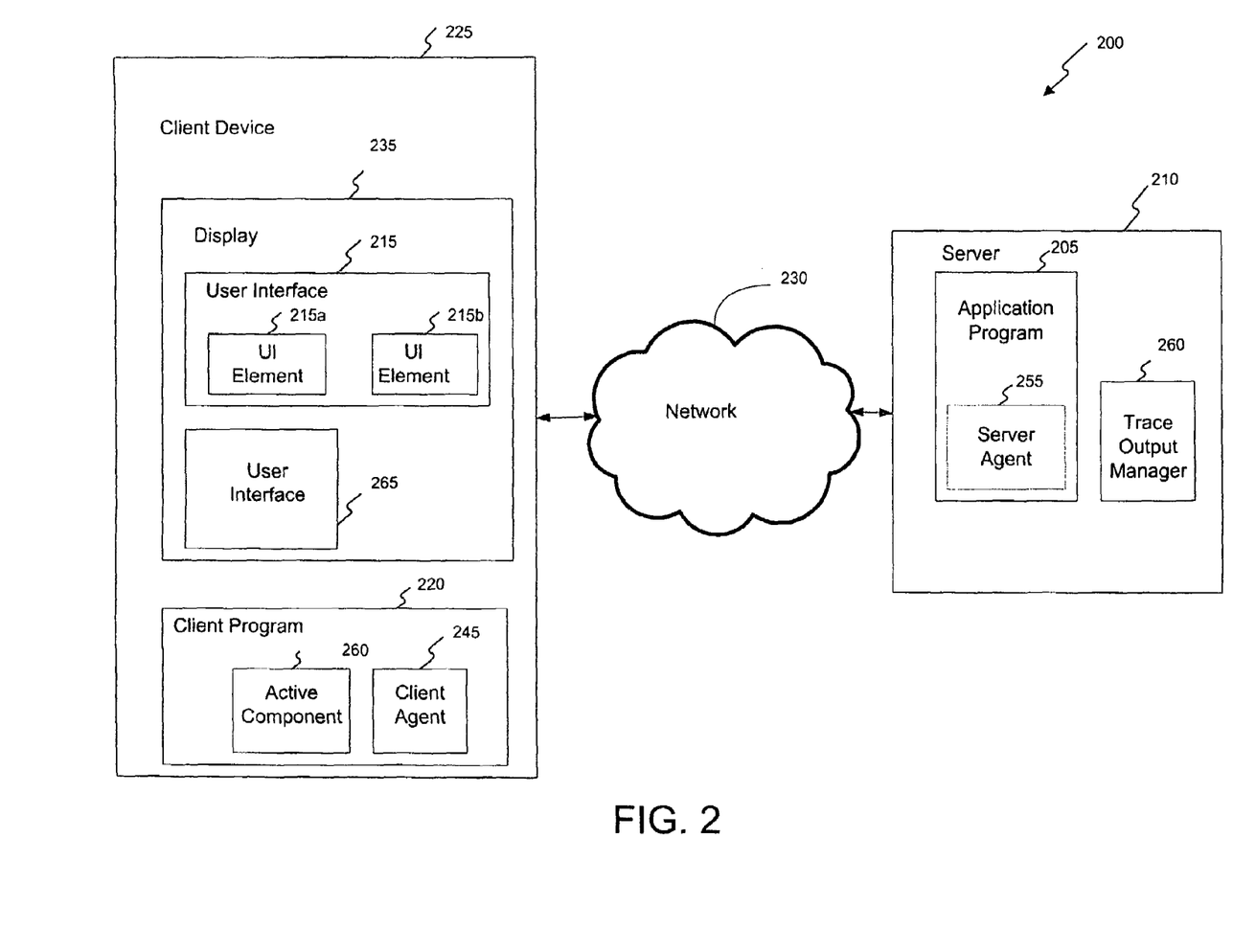
FIG. 2 is a block diagram of a computing system that allows a user to interact with a software application over a network.

As shown in FIG. 2, a system 200 allows a user to interact with a server application program 205 running on a server 210 through a user interface 215 rendered by a client program 220 (e.g., a Web browser, a portal application, and the like) running on a client device 225. The client device 225 communicates with the server 210 over a network 230, which includes, for example, a portion of the Internet. The client device 225 includes a display 235 and a client program 220. The client program 220 is configured to communicate with the server 210 using the network 230 and to render the contents of one or more Web pages received from the server 210. The user interface (UI) 215 contains user interface elements 215a and 215b, also referred to as controls. A control is a user interface element (e.g., 215a) through which a user interacts with, provides input to, and/or controls an application (e.g., server application program 205). Some examples of controls are text fields, radio buttons, tables, trays, and drop-down menus.

In operation, the server application program 205 generates, maintains, retrieves, and/or manipulates data. When the user wants to interact with the server application program 205, the user initiates interaction, for example, by specifying a URL using the client program 220. In response to the specified request, the server 210 transmits instructions to the client program 220 which renders a Web page containing the UI 215 associated with the server application program 205. The UI 215 enables a user to view and modify data associated with the server application program 205 using the UI elements 215a and 215b. For example, the UI element 215a can be a table displaying the names and addresses of employees.

As described above, trace programs can be used to monitor the execution of instructions at the client program 220 and the server application program 205 and generate trace statements of different severity levels. In one implementation, the trace program is provided to the server 210 and the client device 225 in the form of agents 245 and 255. For example, the application developer activates a server agent 255 including the trace program at the server 210 that performs functions independent from the server application program 205, including functions associated with trace management. The server agent 255 can be implemented, for example, using software code that the server application program 205 can process and execute. In this way, the server agent 255 adds the functions associated with trace management to the server application program 205, which does not normally have these functions.

The application developer can also provide a client agent 245 having the trace program to the client device 225. Like the server agent 255, the client agent 245 provides enhanced functionality independent of the client program 220. The client agent 245 can be implemented, for example, using software code that the client program 220 can process and execute. For an example using the Internet and a Web browser client, the client agent 245 includes executable code that is implemented using a scripting language such as the JavaScript™ language code, which is available from Sun Microsystems, Inc. of Santa Clara, Calif. To deliver the code, the server 210 can, for example, embed it directly in a Web page or store the code as a separate file that is referenced in a Web page and downloaded by the client program 220 when the client program 220 processes that Web page. The delivery of the client agent 245 can be separate from the delivery of the UI 215. As part of the delivery mechanism, the server 210 can use information about the client device 225 and/or the client program 220 to determine an appropriate client agent 245 for that client device 225 and client program 220. For example, a request to the server 210 using HTTP includes information about the client device 225 (e.g., processor type, operating system) and/or the client program 220 (e.g., browser type, browser version). The server 210 receives this information with the request and transmits to the client device 225 a version of the client agent 245 that is compatible with (i.e., can be executed by) the browser type and version included in the information.

Suppose, for example, that the application developer wants to document the program flow of the client program 220 and the server application program 205 as a user interacts with the server application program 205 during a testing period defined by the application developer as a period of time (e.g., minutes, hours or days). The application developer sets the severity level of the trace statements to severity level "4" at run-time. The agents 245 and 255 monitor the execution of server application program 205 instructions at the client device 225 and the server 210 as the user interacts with the server application program 205 and generate trace outputs that exhibit the sequence and results of executing the instructions at the client device 225 and the server 210. These trace outputs can include, for example, trace statements that document events, such as the sending of data (e.g., instructions and other information the server 210 transmitted to the client program 220 which the client program 220 used to render a Web page containing the UI 215 associated with the server application program 205), the receiving of data (e.g., instructions and other information received by the client program 220 which the client program 220 used to render a Web page), the displaying of data (e.g., the client program renders a Web page), and the receiving of user input (e.g., a user modifies data associated with the server application program 205 using the UI elements 215*a* and 215*b*), to name a few. Once generated, the client agent 245 can optionally display the generated client-side trace outputs on a user interface 265 rendered by the client agent 245 (e.g., a separate Web browser window) prior to transferring the client-side trace outputs to the server 210 for integration.

The transfer may be initiated by the client agent 245 at some point after the client-side trace output is generated. For example, the client agent 245 may initiate the transfer based upon the passing of a predetermined time period, or the collection of a predetermined number of client-side trace outputs. In another example, each time the client program 220 sends a request to the server 210 (e.g., a request to update data that has been modified by the user at the client program 220 so that the data at the client program 220 and the server application program 205 are in synchronization), the client agent 245 transfers generated client-side trace outputs collected since the previous transfer to the server 210. Alternatively, the transfer may be initiated by a command received by the client agent 245 from the server 210, instructing the client agent 245 to transfer generated client-side trace outputs collected since the previous transfer. In one implementation, the client agent 245 may be configured to transfer the generated client-side trace outputs to a separate buffer that serves as an intermediary between the client agent 245 and the server 210. The use of the buffer can free the client agent 245 from involvement in the trace output transfer process and allows the client agent 245 to be implemented using fewer resources.

The system 200 includes a mechanism that integrates the client-side trace outputs with the server-side trace outputs into a single trace output. In one implementation, the server agent 255 is configured to integrate the server-side trace outputs with the client-side trace outputs it receives from the client agent 245 directly or through the buffer intermediary. Optionally, the server 210 includes a trace output manager 260 that integrates the server-side trace outputs generated by the server agent 255 with the client-side trace outputs generated by the client agent 245. In one example, the client-side trace outputs and the server-side trace outputs are integrated in chronological order to generate a single trace output file. Each time the client program 220 sends a request to the server 205 (e.g., to modify data), the client agent 245 simultaneously transfers all client-side trace outputs that have been generated since the previous client-side trace output transfer to the server 205. Upon receipt of the client-side trace outputs, the trace output manager 260 appends the client-side trace outputs to the server-side trace outputs to form an integrated chronological trace output file. In so doing, the application developer can view a single trace output file to determine the instruction execution sequence first at the server 210, then the client device 225, then back at the server 210, and so on, during the course of a user interaction with the server application program 205. The server 210 can be configured to transfer the integrated chronological trace output file to the client device 225 for display on the user interface 265 rendered by the client agent 245.

Optionally, the client device 225 includes an applet for a programming language such as JAVA™, which is available from Sun Microsystems, Inc. of Santa Clara, Calif. In addition to or in lieu of, the client device 225 also includes an ActiveX control (collectively "active component") that can be executed by the client program 220. Each active component 270 can perform interactive animations, immediate calculations, or other simple tasks without having to send a user request back to the server 205. The client agent 245 can be configured to monitor the execution of instructions at the active component 270 and generate a trace output ("active component trace output") when an event occurs at the active component 270. The active component 270 can also transfer data for the active component trace output to the client agent 245 using a defined API. The client agent 245 can be implemented to integrate the active component trace outputs with trace outputs generated as a result of monitoring the execution of instructions at the client program 220 ("client program trace outputs") to form a client-side trace output. The client agent 245 can then transfer the client-side trace output to the server 210 for integration with the server-side trace output as described above. In an alternative implementation, the client agent 245 transfers the active component trace outputs and the client program trace outputs separately. The server agent 255 receives the trace outputs from the client device 225 and combines the active component trace outputs and the client program trace outputs with the server-side trace outputs in chronological order to generate a single trace output file.

In other examples, the client agent 245 and the server agent 255 can be included as part of a client-side framework and server-side framework, respectively. Similar to the client agent 245 and the server agent 255, the client-side framework and the server-side framework are separate from and independent of the server application program 205. The client-side framework and server-side framework provide additional data management functions at client device 225 and server 210 so that the server application program 205 does not have to provide any code or instructions for those additional data management functions. Such additional data management functions can include, for example, data type validation for inputs, error detection and correction schemes, and user input help. The client-side framework and the server-side framework can be implemented using, for example, JavaScript code from a scripting language such as JavaScript™, identified above.

Figure 3:
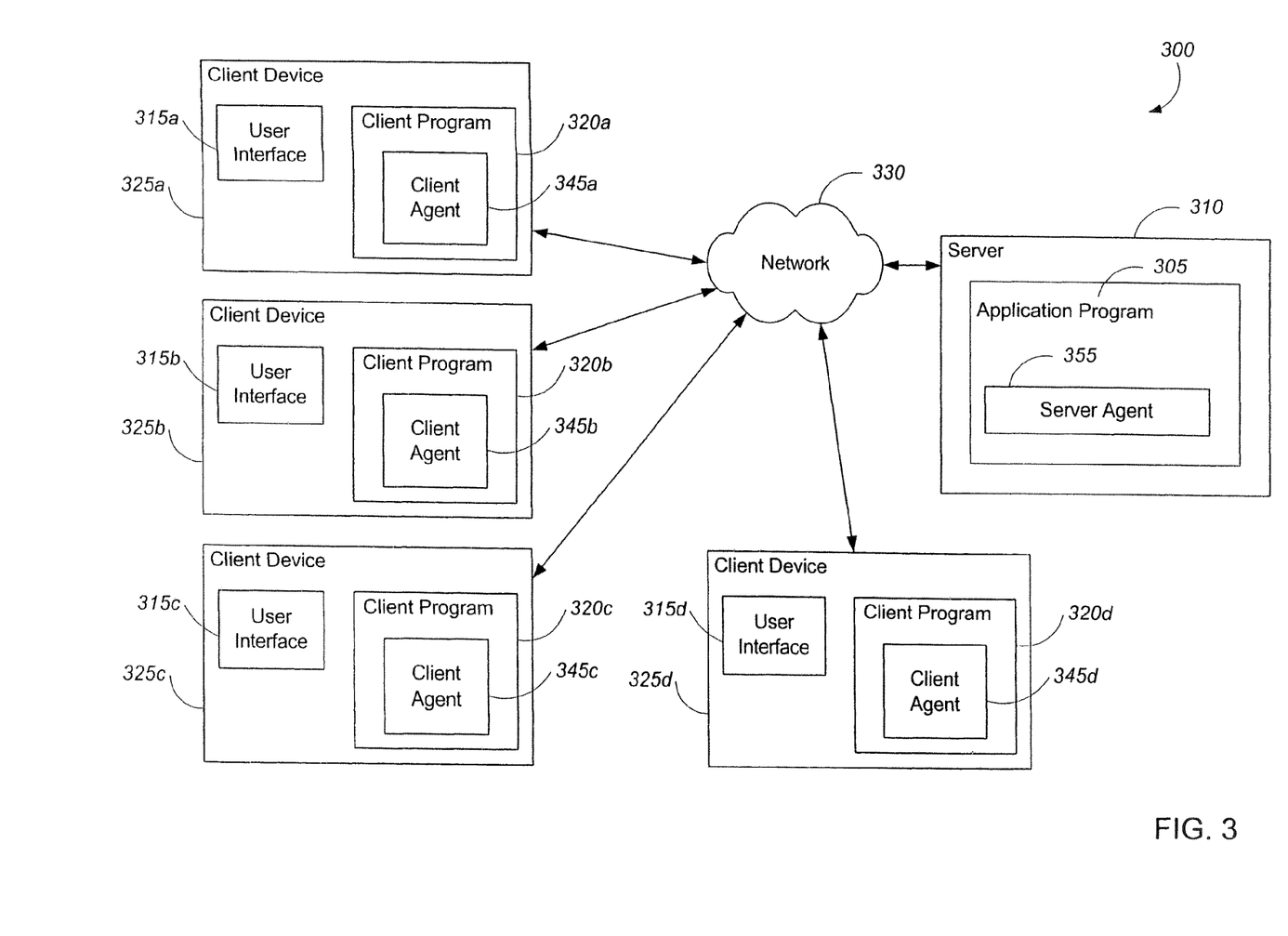
FIG. 3 is a block diagram of a computing system that allows multiples users to interact with a software application over a network.

In the example shown in FIG. 3, a system 300 allows users to interact with a multithreaded server application program 305 running on a server 310 through user interfaces 315a-d rendered by client programs 320a-d (e.g., a Web browser, a portal application, and the like) running on client devices 325a-d, respectively. Each client device 325a-d communicates with the server 310 over a network 330, which includes, for example, a portion of the Internet.

For purposes of the discussion herein, a thread is an independent flow of control that operates within the same address space as other independent flows of controls. Multiple threads may be grouped into a single entity called a process. In a multiprocessor system, multiple threads can execute at the same time, one on each processor. There may be multiple processes executing, each including multiple threads. A process provides a common address space and common system resources, including file descriptors, signal actions, shared libraries, and inter-process communication tools. The thread is the schedulable entity. It has only those properties that are required to ensure its independent flow of control.

The server application program 305 generates, maintains, retrieves, and/or manipulates data. When a user wants to interact with the server application program 305, the user initiates interaction, for example, by specifying a URL using the client program 320a. In response to the specified request, the server 310 transmits instructions to the client program 320a which renders a Web page containing a user interface 315 associated with the multithreaded server application program 305. For example, the UI 315 can include a login dialog box which requires the user to enter a username and password before the server 310 will allow the user to view and/or modify data associated with the server application program 305. Once the server 310 has verified the user's identity, the user can begin a user session with the multithreaded server application program 305. Generally, a series of requests to a Web-based server application program originating from the same user at the same browser is identified by a unique session identifier and comprises a user session. The session identifier can be tracked as cookies or appended to each request sent to the server 310 by a client program 320a-d, and allows only authorized users access to the server application program 305.

Suppose that the application developer wants to trace the non-fatal errors, for example, that occur during user sessions in a given testing period. The application developer sets the severity level of the trace statements to severity level "2" at run-time and designates a two hour window as a testing period. During those two hours, client agents 345a-d residing on the client device 325a-d monitor the execution of instructions at the client programs 320a-d as the authorized users interact with the server application program 305. Upon detection of each non-fatal error at a client program 320a, for example, the client agent 345a generates a client-side trace output which includes the unique session identifier associated with the user session and the sequence and results of executing the instructions at the client device 325a that led to the non-fatal error. The client agent 345a then transfers the generated client-side trace output to the server 310 (as described above).

Also during those two hours, the server agent 355 on the server 310 monitors the execution of instructions by the server application program 305 as one or more authorized users interact simultaneously with the server application program 305. The unique session identifiers enable the server agent 355 to keep track of which user interaction (i.e., request from a client program 320a-d) causes a particular thread of execution in the server application program 305. Each time the server agent 355 detects a non-fatal error in the execution of a thread, the server agent 355 generates a server-side trace output including the unique session identifier associated with that particular thread and the sequence and results of executing the thread that led to the non-fatal error. In one example, the server agent 355 integrates the server-side trace outputs with the client-side trace outputs sharing the same unique session identifier into a single trace output file for each user session at the end of the testing period.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results. Also, although the client agent was described being implemented using a scripting language such as JavaScript™, described above, other languages, including other scripting languages can be used. For example, other scripting languages can include JScript™, which is available from Microsoft Corporation of Seattle, Wash. and/or other languages compliant with the European Computer Manufacturing Associations ECMAScript Language Specification. Although the client agent is illustrated as residing in the client program, some or all of the described functionality can be distributed in other portions of the client device. Also, in addition to the examples above, other portions, or even all of the functionality of the client agent can be incorporated into the client program.

The invention claimed is:

1. A system for generating an integrated trace output file, the system comprising:
    a client comprising a client agent, including:
        a client detection module configured to detect a first event having a first severity level at the client;
        a client generation module configured to generate a client-side trace output in response to the detection of the first event at the client; and
        a client communication module configured to transmit the client-side trace output;
    a server comprising:
        a server processing unit;
        a server agent designed to be executed by the server processing unit, including:
            a server detection module configured to detect a second event having a second severity level at the server;
            a server generation module configured to generate a server-side trace output in response to the detection of the second event at the server;
            a server communication module configured to receive the client-side trace output from the client; and
            a server integration module configured to generate the integrated trace output file by integrating the client-side trace output with the server-side trace output, the integrated trace output file having the client-side trace output appended to the server-side trace output,
    wherein the server is configured to allow a user to set severity levels indicating the integrated trace output file comprises at least one message among an error message, a warning message, an information message, and a debug message.

2. A system comprising:
    at least one client for generating at least one client-side trace output in response to a detection of at least one event having at least one severity level at the at least one client; and
    a server comprising:
    a server processing unit;
    a server agent designed to be executed by the server processing unit, the server agent comprising:
    a server detection module configured to detect a first event having a first severity level at the server;
    a server generation module configured to generate a server-side trace output in response to the detection of the first event having the first severity level at the server;
    a server communication module configured to receive the at least one client-side trace output from the at least one client; and
    a server integration module configured to generate the integrated trace output file by integrating the at least one client-side trace output with the server-side trace output, the integrated trace output file having the at least one client-side trace output appended to the server-side trace output,
    wherein the server is configured to allow a user to set severity levels indicating the integrated trace output file comprises at least one message among an error message, a warning message, an information message, and a debug message.

3. The system of claim 1, wherein the server further comprises an application program including the server agent.

4. The system of claim 2, wherein the client comprises:
a client detection module configured to detect the at least one event having the at least one severity level at the at least one client;
a client generation module configured to generate the at least one client-side trace output in response to the detection of the at least one event at the at least one client; and
a client communication module configured to transfer the at least one client-side trace output to the server for integrating the at least one client-side trace output with the server-side trace output.

5. The system of claim 1, wherein the at least one client further comprises a client program including a client agent.

6. A method for generating trace output files on a system having a client and a server, the server comprising a processing unit, the method comprising:
detecting a first event having a first severity level at the client;
generating a client-side trace output in response to the detection of the first event having the first severity level at the client;
detecting a second event having a second severity level at the server;
generating a server-side trace output in response to the detection of the second event having the second severity level at the server;
transmitting the client-side trace output to the server;
integrating the client-side trace output with the server-side trace output to generate an integrated trace output file having the client-side trace output appended to the server-side trace output; and
setting, by the server processing unit, severity levels indicating the integrated trace output file comprises at least one message among an error message, a warning message, an information message, and a debug message.

7. The method of claim 6, further comprising detecting the first event at the client while a user is interacting with an application program executing on the server.

8. A non-transitory computer program storage product storing instructions that cause a server to:
detect a first event having a first severity level at the server;
generate a server-side trace output in response to the detection of the first event;
receive a client-side trace output from a client, wherein the client-side trace output is generated in response to detection of a second event having a second severity level at the client;
generate an integrated trace output file by integrating the client-side trace output with the server-side trace output, the integrated trace output file having the client-side trace output appended to the-server-side trace output; and
set severity levels indicating the integrated trace output file comprises at least one message among an error message, a warning message, an information message, and a debug message.

9. The non-transitory computer program storage product of claim 8, further comprising instructions to provide an agent to the client.

10. The non-transitory computer program storage product of claim 9, wherein the instructions to provide the agent further comprise instructions to employ executable code.

11. The non-transitory computer program storage product of claim 8, wherein the first severity level indicates whether the server-side trace output comprises an error message, a warning message, an information message, or a debug message.

12. The non-transitory computer program storage product of claim 9, wherein the second severity level indicates whether the second client-side trace output comprises an error message, a warning message, an information message, or a debug message.

13. The non-transitory computer program storage product of claim 8, further comprising instructions to receive an active component trace output from the client.

14. The non-transitory computer program storage product of claim 13, further comprising instructions to combine the active component trace output with the server-side trace output.

15. The non-transitory computer program storage product of claim 9, wherein the client-side trace output includes an active component trace output generated at the client.

16. The non-transitory computer program storage product of claim 8, further comprising instructions to display the integrated trace output file on the client.

17. The non-transitory computer program storage product of claim 16, further comprising instructions to display the integrated trace output file in a separate browser window.

18. The non-transitory computer program storage product of claim 8, wherein the instructions to generate the integrated trace output file comprise instructions to integrate the client-side trace output with the server-side trace output in a chronological order.

* * * * *